June 23, 1931. M. LEVENTHAL 1,811,141
KEY ESCUTCHEON
Filed Feb. 19, 1930  2 Sheets-Sheet 1

INVENTOR
Mitchell Leventhal,
BY Abraham Engel
ATTORNEY

June 23, 1931.  M. LEVENTHAL  1,811,141
KEY ESCUTCHEON
Filed Feb. 19, 1930  2 Sheets-Sheet 2

INVENTOR
Mitchell Leventhal,
BY Abraham Engel
ATTORNEY

Patented June 23, 1931

1,811,141

UNITED STATES PATENT OFFICE

MITCHELL LEVENTHAL, OF BROOKLYN, NEW YORK, ASSIGNOR TO SOSY, INC., OF NEW YORK, N. Y., A CORPORATION OF NEW YORK

KEY ESCUTCHEON

Application filed February 19, 1930. Serial No. 429,628.

The present invention relates to key escutcheons and aims to provide certain improvements therein. More especially it has to do with means for excluding dust, dirt and other foreign matter from gaining entrance into the lock mechanism with which the key escutcheons are associated.

According to the present invention I provide escutcheons of the type described wherein the insertion and entrance of the key into the lock in the conventional manner serves to open the dust guard, and the withdrawal of the key serves to automatically close the dust guard. In its preferred forms the escutcheon comprises a pair of relatively movable or slidable parts which are held in closing or abutting relation by resilient means, the holding pressure of which is easily overcome by a slight pressure on the bit or pin of the key in the act of inserting the said key into the lock, the whole escutcheon being also preferably movable to draw the bolt of the lock into unlatching position.

Several embodiments of my invention are shown in the accompanying drawings, wherein.

Figure 1:
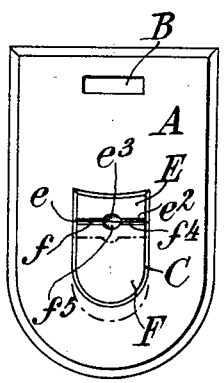
Figure 1 is a front elevation of a suit-case lock or the like provided with an escutcheon embodying the present invention.
Figure 2:
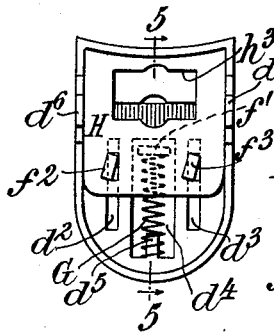
Fig. 2 is a rear view on an enlarged scale of the escutcheon shown in Fig. 1 detached from the lock frame.
Figures 3, 4:
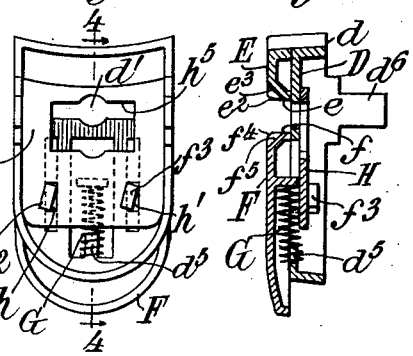
Fig. 3 is a view similar to Fig. 2 showing the dust guard of the escutcheon in open position.
Fig. 4 is a longitudinal section taken substantially along the plane of the line 4—4 of Fig. 3.
Figure 5:
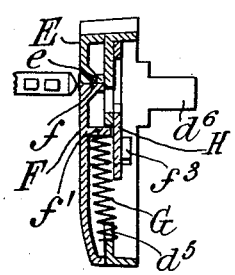
Fig. 5 is a longitudinal section taken substantially along the plane of the line 5—5 of Fig. 2.

Referring first to the embodiment of the invention shown in Figs. 1 to 5, let A indicate a lock frame of a suit-case lock or the like, having a hasp opening B and an escutcheon indicated generally by the reference character C, said escutcheon being movable as a whole relatively to the frame A and in which movement it carries with it the lock bolt (not shown) in a manner well known.

The escutcheon C consists of a casing or frame D having a rearwardly directed flange $d$ extending around the perimeter of the casing. The top face of the casing D is provided with a key hole slot $d'$ and below said key hole slot with three parallel slots $d^2$, $d^3$ and $d^4$, the latter having an inwardly directed pin or lug $d^5$ disposed within the planes of the casing top. Mounted on the top face of the casing D are the complemental face elements E and F, the former being rigidly or integrally formed with the casing D and disposed at one end thereof, and the latter being separately formed from and slidable over the top of casing D relatively to the element E. The elements E and F have their adjacent ends provided with complemental substantially flat faces $e$ and $f$ respectively, which are held in abutting relation above the top of the key-hole slot $d'$ by a coil spring G, one end of which is mounted over the pin $d^5$ and the other end of which abuts against an inwardly extending lug $f'$ of the element F, which lug extends into the recess $d^4$.

For holding the element F in assembled relation on the casing D there is provided at the back of said casing a perforated plate H having openings $h$ and $h'$ through which project lugs $f^2$ and $f^3$ of the element F, which lugs after passing through said openings are twisted or bent over so as to hold the parts in assembled relation. The plate H also has an enlarged recess $h^3$ which provides a clearance for the bit of a key when inserted into the lock. To facilitate the entrance of a key through the escutcheon into the lock the abutting faces $e$ and $f$ of the elements E and F are slightly bevelled as shown at $e^2$ and $f^4$ respectively, and at their middle are provided with countersunk depressions $e^3$ and $f^5$ so as to provide a guide and wedging surface for the bit or pin of a key, which when pressed into the recess $e^3$, $f^5$ will move the element F against the action of the spring G to open the dust guard and permit the entrance of the key into the lock. While the key is in the lock it will be apparent that the dust guard will be maintained in open position, but upon the withdrawal of the key the spring G will immediately move the element F into cooperative relation with the element E to again establish the dust guard. For mounting the escutcheon in cooperative relation with the lock mechanism the casing D is provided with lugs $d^6$ at its opposite edges.

Figures 6, 7, 8:
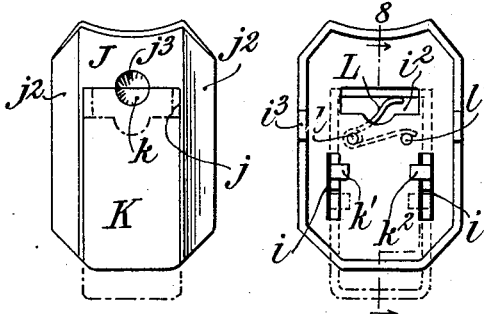
Fig. 6 is a front elevation of a slightly modified construction of the escutcheon.
Fig. 7 is a rear view of the escutcheon shown in Fig. 6.
Fig. 8 is a longitudinal section taken substantially along the plane of the line 8—8 of Fig. 7.

In the modified form of escutcheon shown in Figs. 6 to 8 there is provided a casing I corresponding to the casing D of Figs. 1 to 5 and upon said casing is mounted the elements J and K, the former being rigidly fixed to or integral with the casing I while the latter is formed separately from and slidable upon the casing I. The fixed element J extends substantially around three sides of the casing I with which its edges are in coincident relation and provides a recess or groove $j$ in which the element K slidably fits, the top surfaces of the elements J and K being flush with one another and the sides of the element J tapering downwardly from said top as shown at $j^2$. At their top adjacent faces, the elements J and K are in flat abutting relation and are provided with countersunk depressions $j^3$ and $k$ respectively for accommodating the bit of a key. For holding the element K in assembled relation upon the casing I the former is provided with lugs $k'$ and $k^2$ which extend through and are movable in longitudinal openings $i$ and $i'$ respectively in the casing I, said lugs being bent down over the back of said casing to prevent their withdrawal therefrom. To normally hold the top end face of the element K in abutting relation to the adjacent face of the element J so as to provide a dust-proof closure, there is employed a coil spring L which is anchored around a pin $l$ carried by the casing I, one end of said spring being upon a pin $l'$ also carried by the casing I and the other end bearing against the inner side of the end face of the element K, as best shown in Figs. 7 and 8. To accommodate the key after it has passed through the dust guard the top face of the casing I is provided with a key hole slot $i^2$. To mount the escutcheon upon a lock mechanism it is provided with side lugs $i^3$.

Figure 9:
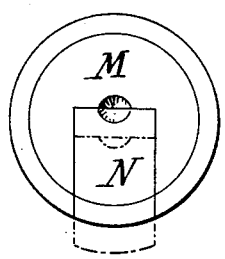
Fig. 9 is a front elevation of a further embodiment of my invention.
Figure 10:
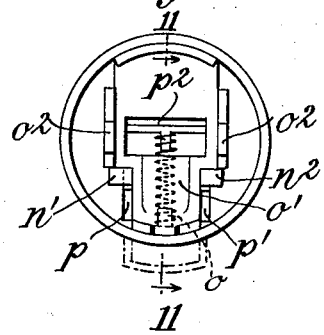
Fig. 10 is a rear view of the escutcheon shown in Fig. 9.
Figure 11:
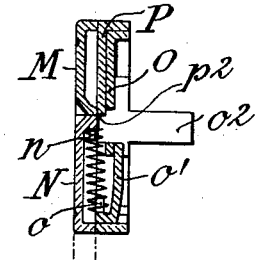
Fig. 11 is a longitudinal section taken substantially along the plane of the line 11—11 of Fig. 10.
Figure 12:
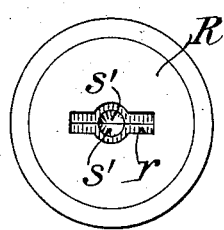
Fig. 12 is a front elevation of still another embodiment of my invention.
Figure 13:
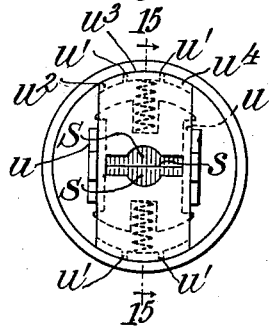
Figs. 13 and 14 are rear views of the escutcheon shown in Fig. 12, Fig. 14 showing the dust guard in open position.
Figure 14:
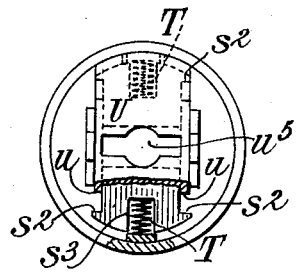
Figure 15:
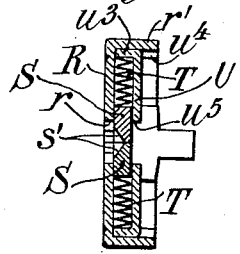
Fig. 15 is a longitudinal section taken substantially along the plane of the line 15—15 of Fig. 13.

In Figs. 9 to 11 there is shown a still further embodiment of the invention, wherein the escutcheon elements M and N may be considered analogous to the elements J and K of Figs. 6 to 8 excepting that the outer contour of the escutcheon in the present instance is circular. The spring mounting of the element N may also be considered analogous to the spring mountings of Figs. 2 to 5 excepting that in the present instance the pin anchorage $o$ is formed as an inwardly and upwardly directed lug formed on a back plate O and the anchorage for the top of the spring is a pin $n$ formed integrally with the element N. For holding the element N in assembled relation on the casing P the latter is provided with parallel slots $p$, $p'$ through which extend lugs $n'$ and $n^2$ which are bent down against the back face of the casing as shown in Fig. 10. The top face of the casing P is provided with a clearance slot $p^2$ for accommodating the bit of a key after passing through the dust guard. In this embodiment of the invention the rear plate O is bowed as shown at $o'$ to provide a housing for the spring and said plate likewise carries the projecting lugs $o^2$ whereby the escutcheon is attached to a lug mechanism.

In the embodiment of my invention shown in Figs. 12 to 15, inclusive, the escutcheon R is provided on its top face with a conventional key opening $r$. Mounted to the rear of said face and in sliding engagement therewith is a pair of spring-pressed plates S, S, the abutting edges of which meet in a straight line $s$ substantially midway of the key opening $r$ and centrally of said key opening are provided with countersunk or bevelled surfaces $s'$, $s'$. Each of the guard plates S has parallel sides and terminates at its outer end with outwardly projecting lips $s^2$, $s^2$, and is formed midway between said lips with a recess $s^3$ within which is housed a coil spring T. For guiding and limiting the plates S, S, in their movement toward each other there is mounted on the back of the casing R a plate or element U having inwardly directed lugs $u$ engaging and guiding the sides of the plates S and against the ends of which the lips $s^2$ are adapted to bear to limit the movement of the plates toward each other. The opposite ends of the plate U are incut as shown at $u'$ to provide lugs $u^2$, $u^3$ and $u^4$, $u^3$ of which is turned toward the top of the casing to form abutments for the springs T and the lugs $u^2$ and $u^4$ are turned toward the back of the casing and are attached to the inwardly directed flange $r'$ thereof to anchor said rear plate to said casing. To provide clearance for the bit of the key through the rear plate U the latter is provided with the opening $u^5$.

In the operation of this last described form of the invention it will be apparent that as the bit of the key is inserted into the key opening $r$ and is pressed against the countersunk recess $s'$ the plates S, S will be moved apart against the action of the springs T to open the dust guard and permit the entrance of the key into the lock. Upon withdrawal of the key the springs T will press the plates S into the position shown in Figs. 12, 13 and 15.

Figure 16:
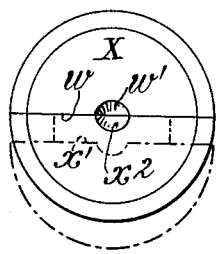
Fig. 16 is a front elevation of still another embodiment of my invention.
Figure 17:
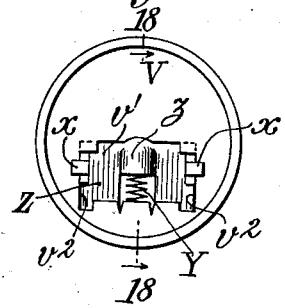
Fig. 17 is a rear view of the escutcheon shown in Fig. 16.
Figure 18:
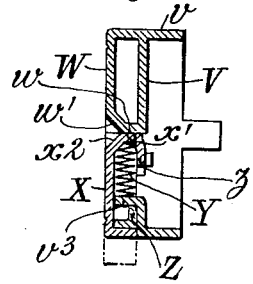
Fig. 18 is a section taken substantially along the plane of the line 18—18 of Fig. 17.

In the modification of the invention shown in Figs. 16, 17 and 18, there is provided a casing V of circular contour having a rearwardly directed integral flange $v$. Mounted on the top face of the casing V are semi-circular elements W and X, the former being rigidly or integrally united to the casing V while the latter is mounted to slide thereon. For guiding the element X in its sliding movement on the casing V the top of said casing has a portion thereof cut out as shown at $v'$, said cut out portion having parallel opposite sides $v^2$, $v^2$, and the element X has a pair of lugs $x$, $x$, which extend through the opening $v'$ in contact with the parallel edges $v^2$ and over which they are bent down as shown in Fig. 17. To normally hold the element X with its diametrical face $x'$ in contact with the diametrical face $w$ of the elements W there is provided a coil spring Y, one end of which bears against a projection $v^3$ extending upwardly from the face of the casing V and into the element X and the other end of which spring bears against the under side of the diametrical face $x'$. To provide a housing for the spring Y the back of the element X is provided with a plate Z, the upper face of which is depressed or bowed out of its plane as shown at $z$. The abutting edges of the complemental elements W and X are formed at their middle with tapered or countersunk portions $w'$ and $x^2$ for accommodating the bit of a key, which, when pressed thereagainst will move the element X to open the guard plate and permit the entrance of the key through the opening $v^2$ into the lock.

From the foregoing detailed descriptions it will be apparent that I have provided simple, practical and novel means for excluding dust, dirt and other foreign matter from gaining entrance into a lock mechanism through the key escutcheon thereof, and although I have shown numerous embodiments of my invention it is to be understood that changes in the specific details of construction disclosed may be resorted to without departing from the spirit of the invention.

What I claim is:

1. An escutcheon comprising an element having a key-hole therein, a member mounted on, and slidable relatively to said element and having its top surface substantially flush with the top surface of the element, a shoulder on said element in superposed relation to the keyhole, the slidable member having an end face normally held in abutting relation to said shoulder, and a depression in at least one of the aforementioned parts at their abutting surfaces adapted to receive the bit end of a key, said slidable member being adapted to yield and permit the entrance of the key into the key-hole when said key is pressed against said depression.

2. An escutcheon comprising an element having a key-hole therein, a recess in the top face of said element, an end wall of said recess being in substantially superposed relation to the key-hole, a member having its top surface flush with the top surface of the element slidable in said recess and guided by the walls thereof and having one end normally in abutting relation to said end wall, means normally holding said parts in said cooperative relation, and a depression in the top face of at least one of said parts at their abutting ends adapted to receive the bit end of a key, said slidable member being adapted to yield and permit the entrance of the key into the key-hole when said key is pressed against said depression.

In witness whereof, I have hereunto signed my name.

MITCHELL LEVENTHAL.